United States Patent
Nakamura et al.

(10) Patent No.: US 10,122,216 B2
(45) Date of Patent: Nov. 6, 2018

(54) POWER TRANSMITTING DEVICE AND POWER RECEIVING DEVICE

(71) Applicant: TOYOTA JIDOSHA KABUSHIKI KAISHA, Toyota-shi, Aichi-ken (JP)

(72) Inventors: Toru Nakamura, Toyota (JP); Takahiro Misawa, Toyota (JP); Hideaki Yamada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 15/124,965

(22) PCT Filed: Jan. 29, 2015

(86) PCT No.: PCT/JP2015/000390
§ 371 (c)(1),
(2) Date: Sep. 9, 2016

(87) PCT Pub. No.: WO2015/162832
PCT Pub. Date: Oct. 29, 2015

(65) Prior Publication Data
US 2017/0033609 A1    Feb. 2, 2017

(30) Foreign Application Priority Data

Apr. 25, 2014   (JP) .................... 2014-091470

(51) Int. Cl.
*H02J 50/12* (2016.01)
*B60L 11/18* (2006.01)
(Continued)

(52) U.S. Cl.
CPC ............. *H02J 50/12* (2016.02); *B60L 11/182* (2013.01); *H02J 5/005* (2013.01); *H02J 7/025* (2013.01);
(Continued)

(58) Field of Classification Search
None
See application file for complete search history.

(56) References Cited

U.S. PATENT DOCUMENTS 7,741,734 B2    6/2010   Joannopoulos et al.
9,912,201 B2 *  3/2018   Oettinger ........... G01R 33/0041
(Continued)

FOREIGN PATENT DOCUMENTS

AU    2006269374 B2    1/2007
AU    2007349874 A2    10/2008
(Continued)

*Primary Examiner* — Jared Fureman
*Assistant Examiner* — James Evans
(74) *Attorney, Agent, or Firm* — Oliff PLC

(57) ABSTRACT

A power transmitting device includes a power transmitting coil that forms a magnetic field when an AC voltage is applied thereto and transmits electric power in a non-contact manner to a power receiving coil through the magnetic field, a foreign object detector, a magnetic field detector, and a control device that receives information about a result of detection of a foreign object by the foreign object detector and information about a result of detection of the magnetic field by the magnetic field detector. The control device determines whether there is a foreign object or not based on the result of the detection of a foreign object performed by the foreign object detector during a timing period when the strength of the magnetic field is equal to or lower than a prescribed value.

16 Claims, 8 Drawing Sheets

(51) Int. Cl.
*H02J 50/60* (2016.01)
*H02J 5/00* (2016.01)
*H02J 7/02* (2016.01)

(52) U.S. Cl.
CPC ........... *H02J 50/60* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2013/0069441 A1* | 3/2013 | Verghese | G01R 33/10 307/104 |
| 2013/0127409 A1 | 5/2013 | Ichikawa | |
| 2013/0193749 A1 | 8/2013 | Nakamura et al. | |
| 2013/0241300 A1* | 9/2013 | Miyamoto | H01F 5/003 307/104 |
| 2013/0263596 A1* | 10/2013 | Arisawa | F01K 25/00 60/643 |
| 2013/0293026 A1 | 11/2013 | Miyamoto et al. | |
| 2014/0015329 A1 | 1/2014 | Widmer et al. | |
| 2014/0084857 A1* | 3/2014 | Liu | H02J 5/005 320/108 |
| 2014/0084859 A1* | 3/2014 | Hall | B60L 3/00 320/108 |
| 2014/0125287 A1 | 5/2014 | Nakano et al. | |
| 2015/0008877 A1 | 1/2015 | Ichikawa et al. | |
| 2015/0028875 A1 | 1/2015 | Irie et al. | |
| 2015/0162752 A1 | 6/2015 | Endo | |
| 2016/0149442 A1* | 5/2016 | Asanuma | H02J 50/60 307/104 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-017379 A | 1/2013 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-188072 A | 9/2013 |
| JP | 2013-236422 A | 11/2013 |
| JP | 2015-533273 A | 11/2015 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013179394 A1 | 12/2013 |

\* cited by examiner

POWER TRANSMITTING DEVICE AND POWER RECEIVING DEVICE

TECHNICAL FIELD

The present invention relates to a power transmitting device and a power receiving device that transmit and receive electric power in a non-contact manner.

BACKGROUND ART

The following patent literatures 1 to 6 each disclose a power transmitting device and a power receiving device that transmit and receive electric power in a non-contact manner. Patent Literature 1 also discloses an invention related to a metal detection method. This method detects the presence or absence of a metal based on the presence or absence of variation in basic frequency of an oscillating current flowing through a metal detection coil.

CITATION LIST

Patent Literature

[PTL 1] Japanese Patent Laying-Open No. 2013-188072
[PTL 2] Japanese Patent Laying-Open No. 2013-154815
[PTL 3] Japanese Patent Laying-Open No. 2013-146154
[PTL 4] Japanese Patent Laying-Open No. 2013-146148
[PTL 5] Japanese Patent Laying-Open No. 2013-126327
[PTL 6] Japanese Patent Laying-Open No. 2013-110822

SUMMARY OF INVENTION

Technical Problem

A foreign object detector such as a metal detection coil is utilized in detecting a foreign object. Before electric power transmission is performed between a power transmitting device and a power receiving device, a foreign object detector can accurately detect the presence or absence of a foreign object. While electric power transmission is being performed, however, it may be difficult to accurately detect the presence or absence of a foreign object using a foreign object detector because the foreign object detector is affected by a magnetic field.

Solution to Problem

A power transmitting device that transmits electric power in a non-contact manner to a power receiving device provided outside includes a power transmitting coil that forms a magnetic field when an AC voltage is applied thereto, and transmits electric power in a non-contact manner to a power receiving coil of the power receiving device through the magnetic field, a foreign object detector that detects a foreign object located on or in the vicinity of the power transmitting device, a magnetic field detector that detects the magnetic field, and a control device that receives information about a result of the detection of a foreign object by the foreign object detector and information about a result of the detection of the magnetic field by the magnetic field detector, the control device determining whether there is a foreign object or not based on the result of the detection of a foreign object performed by the foreign object detector during a timing period when the strength of the magnetic field is equal to or lower than a prescribed value.

Since the effect of the magnetic field on the foreign object detector is small during the timing period when the strength of the magnetic field is equal to or lower than the prescribed value, it can be said that a result of foreign object detection with certain reliability is obtained.

Preferably, the magnetic field detector includes a coil where an induced voltage is generated by the magnetic field, and the timing period when the strength of the magnetic field is equal to or lower than the prescribed value is a timing period when an absolute value of the induced voltage generated in the coil by the magnetic field is equal to or lower than a prescribed value.

The strength of the magnetic field around the coil can be easily detected by the induced voltage generated in the coil, which in turn enables easy detection of the timing period when the strength of the magnetic field is equal to or lower than the prescribed value.

Preferably, the foreign object detector includes a first coil that forms a magnetic field for detection when an AC voltage for detection is applied thereto, and a second coil that is arranged to face the first coil and generates an induced voltage by the magnetic field for detection formed by the first coil, and the control device determines whether there is a foreign object or not based on a power receiving state of the second coil, the power receiving state being calculated from a value of the induced voltage generated in the second coil by the magnetic field for detection.

If a configuration of a pair of coils formed of the first coil and the second coil is employed, since the effect of the magnetic field on the foreign object detector is also small during the timing period when the absolute value of the induced voltage generated in the magnetic field detector by the magnetic field is equal to or lower than the prescribed value, it can be said that a result of foreign object detection with certain reliability is obtained.

Preferably, the first coil and the second coil form a pair of coils, the foreign object detector includes a plurality of the pairs of coils, the power transmitting device further includes a switching device that switches between pairs of coils to be selected of the plurality of pairs of coils, and the switching device successively switches between combinations of the first coil to which the AC voltage for detection is applied and the second coil whose induced voltage is calculated by successively switching between pairs of coils to be selected of the plurality of pairs of coils at each timing period.

For example, the position of a foreign object can be identified when the plurality of pairs of coils formed of the first coils and the second coils are arranged over a large area.

Preferably, the switching device includes a first multiplexer connected to one terminal of each of the plurality of first coils via a first common line, a second multiplexer connected to the other terminal of each of the plurality of first coils via a second common line, a third multiplexer connected to one terminal of each of the plurality of second coils via a third common line, and a fourth multiplexer connected to the other terminal of each of the plurality of second coils via a fourth common line.

By employing the common lines, a total amount of the lines can be reduced to thereby reduce the lines the magnetic field links. The effect of the magnetic field can be reduced, thereby enabling foreign object detection with certain reliability.

Preferably, each of the first coil and the second coil has a shape formed by arranging a pair of coil elements having the same number of turns and wound in opposite directions on the same plane and connecting the pair of coil elements in series with each other.

The pair of coil elements reduces the generation of the induced voltage, thereby further reducing the effect of the magnetic field.

A power receiving device that receives electric power in a non-contact manner from a power transmitting device provided outside includes a power receiving coil that receives electric power in a non-contact manner from a power transmitting coil of the power transmitting device through a magnetic field, the magnetic field being formed by the power transmitting coil when an AC voltage is applied thereto, a foreign object detector that detects a foreign object located below or in the vicinity of the power receiving device, a magnetic field detector that detects the magnetic field, and a control device that receives information about a result of the detection of a foreign object by the foreign object detector and information about a result of the detection of the magnetic field by the magnetic field detector, the control device determining whether there is a foreign object or not based on the result of the detection of a foreign object performed by the foreign object detector during a timing period when the strength of the magnetic field is equal to or lower than a prescribed value.

As with the power transmitting device, since the effect of the magnetic field on the foreign object detector is small during the timing period when the strength of the magnetic field is equal to or lower than the prescribed value, it can be said that a result of foreign object detection with certain reliability is obtained.

Preferably, the magnetic field detector includes a coil where an induced voltage is generated by the magnetic field, and the timing period when the strength of the magnetic field is equal to or lower than the prescribed value is a timing period when an absolute value of the induced voltage generated in the coil by the magnetic field is equal to or lower than a prescribed value.

As with the power transmitting device, the strength of the magnetic field around the coil can be easily detected by the induced voltage generated in the coil, which in turn enables easy detection of the timing period when the strength of the magnetic field is equal to or lower than the prescribed value.

Advantageous Effects of Invention

The presence or absence of a foreign object can be detected using a foreign object detector even while electric power transmission is being performed.

DESCRIPTION OF EMBODIMENTS

Embodiments will be described below with reference to the drawings. When a reference is made to a number, an amount and the like, the scope of the present invention is not necessarily limited to the number, the amount and the like unless otherwise specified. The same or corresponding components are designated by the same reference numbers and redundant description may not be repeated.

First Embodiment (Non-Contact Electric Power Transmission System 1000)

Figure 1:
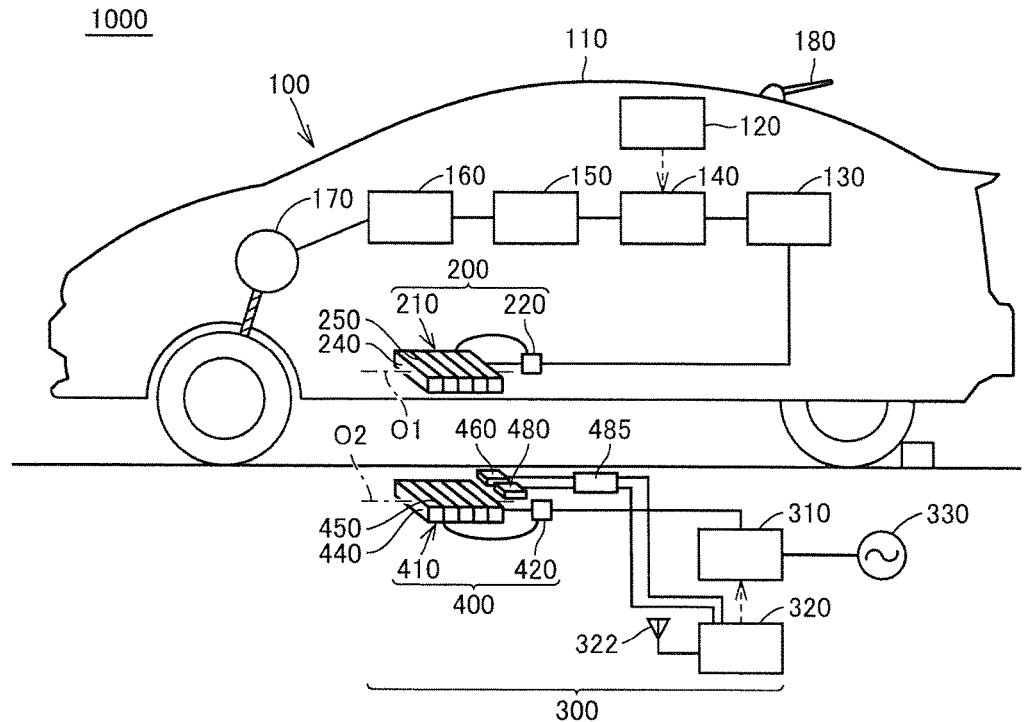
FIG. 1 is a diagram showing an electric power transmission system in a first embodiment.

Referring to FIG. 1, a non-contact electric power transmission system 1000 in a first embodiment is described. Non-contact electric power transmission system 1000 includes a vehicle 100 and an outside power feeding apparatus 300. Vehicle 100 includes a vehicle body 110 and a power receiving device 200. Vehicle body 110 includes a vehicle ECU 120, a rectifier 130, a DC/DC converter 140, a battery 150, a power control unit 160, a motor unit 170, a communication unit 180, and the like.

Power receiving device 200 receives electric power in a non-contact manner from a power transmitting device 400 of outside power feeding apparatus 300 while facing power transmitting device 400. Power receiving device 200 includes a power receiving unit 210 and a capacitor 220, power receiving unit 210 including a core 240 and a power receiving coil 250 wound around core 240. Power receiving coil 250 is disposed such that a coil winding axis O1 of power receiving coil 250 extends in a front-back direction of the vehicle. The number of turns of power receiving coil 250 is appropriately set so as to increase the distance between power receiving coil 250 and a power transmitting coil 450 of power transmitting device 400, and a Q value (for example, Q being equal to or more than 100) showing the intensity of resonance between power receiving coil 250 and power transmitting coil 450 and a coupling coefficient k showing the degree of coupling therebetween.

Outside power feeding apparatus 300 includes power transmitting device 400, a high-frequency power device 310, a power transmitting ECU 320, and a communication unit 322. High-frequency power device 310 is connected to an AC power supply 330 and power transmitting device 400. Power transmitting device 400 includes a power transmitting unit 410 and a capacitor 420, power transmitting unit 410 including a core 440 and power transmitting coil 450 wound around core 440. It is intended that coil winding axis O1 of power receiving coil 250 and a coil winding axis O2 of power transmitting coil 450 are parallel to each other when vehicle 100 is parked in a position where electric power transmission can be performed. Power transmitting coil 450 forms a magnetic field when high-frequency power (AC voltage) is applied thereto from high-frequency power device 310. Power transmitting coil 450 transmits electric power in a non-contact manner to power receiving coil 250 of power receiving unit 210 by electromagnetic induction through the magnetic field.

(Foreign Object Detector 460, Magnetic Field Detector 480, Control Device 485)

Power transmitting device 400 further includes a foreign object detector 460, a magnetic field detector 480 and a control device 485. If there is a foreign object such as a metal between power receiving unit 210 and power transmitting unit 410, electric power transmission efficiency (power reception efficiency of power receiving unit 210) may be lowered or the foreign object may generate heat. Possible foreign objects include, for example, a piece of metal (such as a beverage can or a coin), an animal and the like between power receiving unit 210 and power transmitting unit 410. Such foreign objects can be detected by using foreign object detector 460, magnetic field detector 480 and control device 485. As will be described later in detail, foreign object detector 460 includes a plurality of first coils (see first coils 468 in FIG. 3) and a plurality of second coils (see second coils 478 in FIG. 3).

Figure 3:
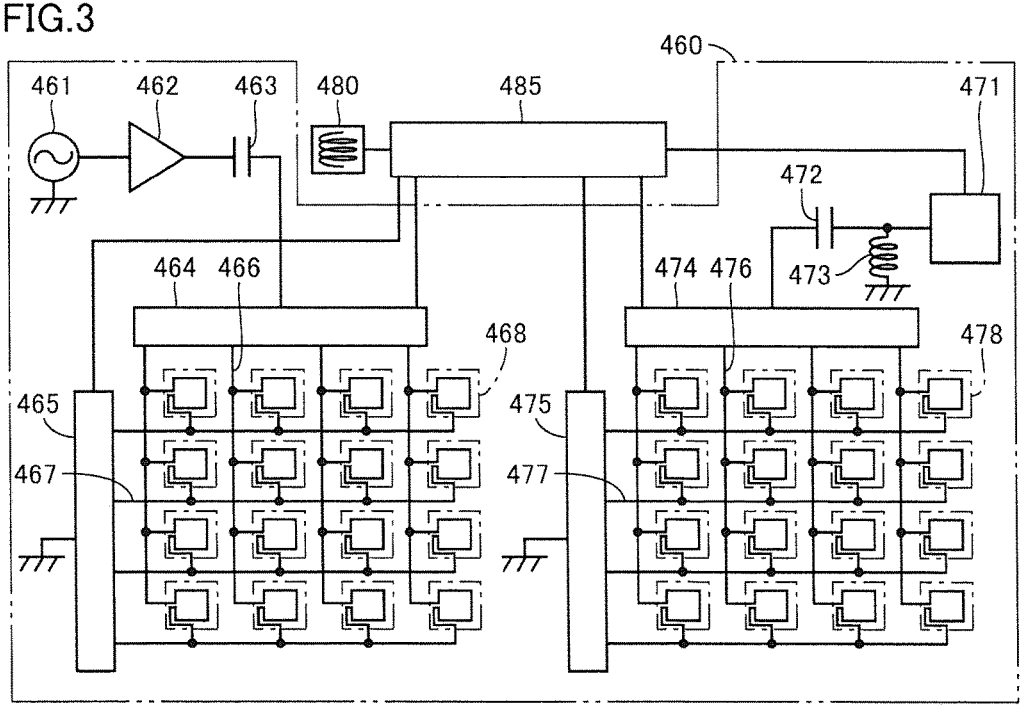
FIG. 3 is a diagram showing an electrical configuration of a foreign object detector, a magnetic field detector and a control device included in the power transmitting device in the first embodiment.

Magnetic field detector 480 contains a coil (see FIG. 3). During electric power transmission, a magnetic field is formed between power receiving unit 210 (FIG. 1) and power transmitting unit 410. The coil of magnetic field detector 480 is disposed in a position covered by this magnetic field. Magnetic field detector 480 transmits information about an induced voltage, which is generated in this coil affected by the magnetic field, to control device 485 as an electric signal. In this embodiment, the information transmitted to control device 485 is utilized in controlling timing when foreign object detector 460 is activated (which will be described later with reference to FIG. 6).

Figure 2:
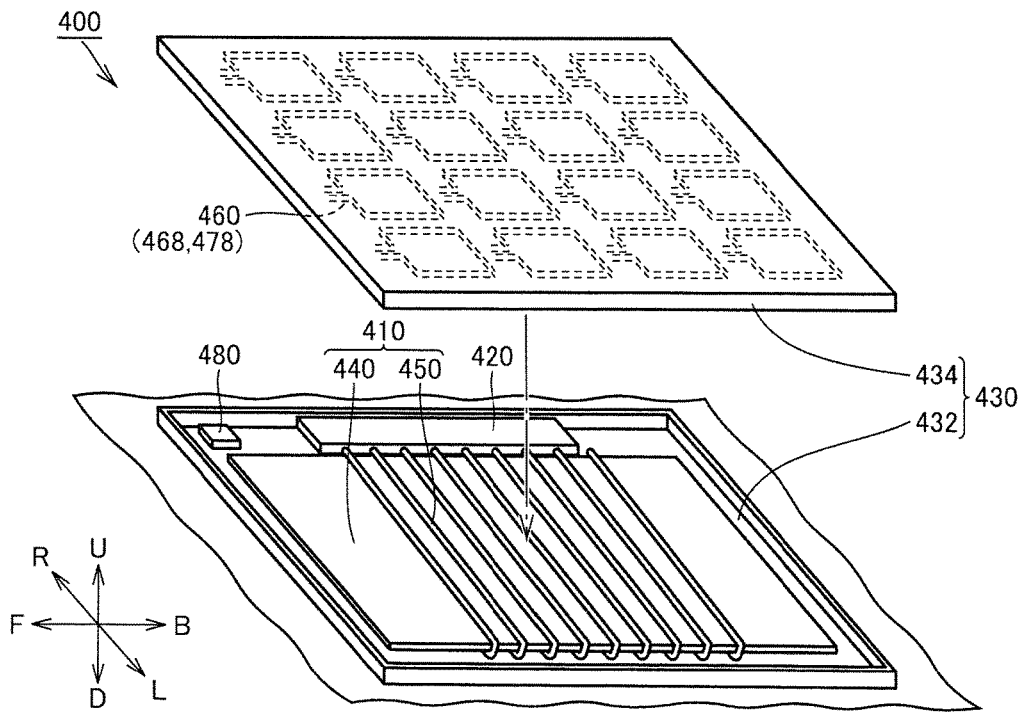
FIG. 2 is a perspective view showing a power transmitting device in the first embodiment.

FIG. 2 is a perspective view showing power transmitting device 400 in a disassembled state. An arrow D indicates a vertically downward direction, an arrow U indicates a vertically upward direction, an arrow L indicates a vehicle left-hand direction, an arrow R indicates a vehicle right-hand direction, an arrow F indicates a vehicle forward direction, and an arrow B indicates a vehicle backward direction. These directions apply to FIGS. 4, 7 and 17 which will be described later.

As an example, core 440 used in power transmitting device 400 is made of ferrite, and has a size of 400 mm×400 mm when viewed two-dimensionally. Power transmitting unit 410 (core 440 and power transmitting coil 450), capacitor 420, foreign object detector 460 and magnetic field detector 480 of power transmitting device 400 are contained in a housing 430. Housing 430 has a shield 432 and a cover member 434.

Figure 4:
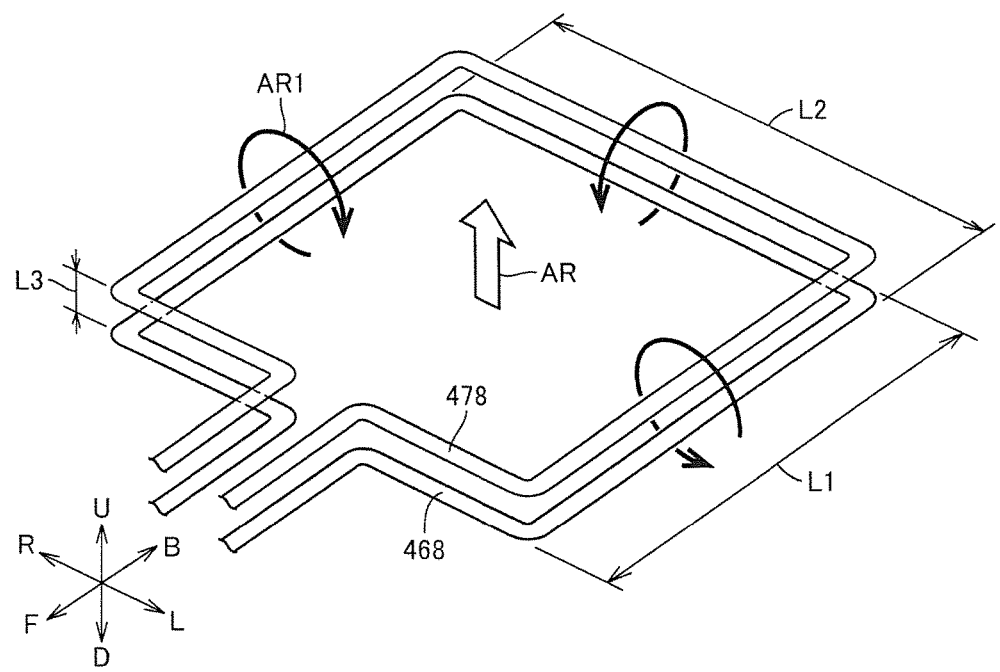
FIG. 4 is a perspective view showing a first coil and a second coil of the foreign object detector included in the power transmitting device in the first embodiment.

The plurality of first coils 468 and the plurality of second coils 478 forming foreign object detector 460 have the same size and shape (see FIG. 4). One first coil 468 and one second coil 478 are arranged to face each other, to form one pair of coils. The plurality of first coils 468 and the plurality of second coils 478 are attached on an inner surface of cover member 434 such that the plurality of pairs of coils are arranged in a matrix (see FIG. 2).

The magnetic field formed between power receiving unit 210 (FIG. 1) and power transmitting unit 410 during electric power transmission covers foreign object detector 460 (the plurality of first coils 468 and the plurality of second coils 478). In other words, the plurality of first coils 468 and the plurality of second coils 478 of foreign object detector 460 are disposed in a position covered by this magnetic field. Magnetic field detector 480 is disposed on a bottom surface of shield 432. As described above, a magnetic field is formed between power receiving unit 210 (FIG. 1) and power transmitting unit 410 during electric power transmission. The coil of magnetic field detector 480 (see FIG. 3) is also disposed in a position covered by this magnetic field.

(Electrical Configuration of Foreign Object Detector 460 and the Like)

FIG. 3 is a diagram showing an electrical configuration of foreign object detector 460, magnetic field detector 480 and control device 485 (see also FIG. 1). Foreign object detector 460 includes, in addition to the plurality of first coils 468 and the plurality of second coils 478, an oscillator 461, a power amplifier 462, a resonant capacitor 463, multiplexers 464, 465, common lines 466, 467, a signal processing circuit 471, a resonant capacitor 472, a resonant resistor 473, multiplexers 474, 475, and common lines 476, 477.

For purposes of illustration, the plurality of first coils 468 and the plurality of second coils 478 are shown in FIG. 3 as being away from each other in a horizontal direction. In fact, one first coil 468 and one second coil 478 are arranged to face each other, to form one pair of coils (see FIG. 4). In this embodiment, a total of sixteen pairs of coils are attached on the inner surface of cover member 434 (FIG. 2).

FIG. 4 is a perspective view showing first coil 468 and second coil 478. Each of first coil 468 and second coil 478 has a coil portion in a rectangular shape. The size of this coil portion is such that it has a length L1 of 20 mm and a length L2 of 20 mm, for example. A distance L3 between first coil 468 and second coil 478 is several mm, for example. Such arrangement of a pair of coils can be readily fabricated, for example, by patterning metal lines on opposite surfaces of a print substrate.

As shown in FIG. 4, when an AC voltage for detection is applied to one first coil 468, this first coil 468 forms a magnetic field for detection (see an arrow AR1 in FIG. 4). Second coil 478 arranged to face this first coil 468 generates an induced voltage by the magnetic field for detection formed by this first coil 468. Control device 485 measures the induced voltage generated in second coil 478 by the magnetic field for detection and calculates a power receiving state (for example, power reception efficiency) of second coil 478, to determine whether there is a foreign object or not within the magnetic field for detection based on the power receiving state of second coil 478.

In this embodiment (see FIG. 3), multiplexers 464, 465, 474 and 475 function as a "switching device." The switching device successively switches among pairs of coils to be selected. In this manner, combinations of one of the plurality of first coils 468 to which the AC voltage for detection should be applied and one of the plurality of second coils 478 whose induced voltage should be measured are successively switched. This will be more specifically described below.

Referring to FIG. 3, oscillator 461 generates a signal having an arbitrary frequency (for example, 13.56 MHz), which is amplified by power amplifier 462. An AC voltage for detection of a foreign object which is generated by the amplification is input to multiplexer 464 through resonant capacitor 463. Multiplexer 464 is connected to resonant capacitor 463, control device 485 and four common lines 466. On the other hand, multiplexer 465 is connected to a ground line, control device 485 and four common lines 467.

One common line 466 (first common line) is connected to one terminal of each of four first coils 468. One common line 467 (second common line) is connected to the other terminal of each of four first coils 468. Multiplexer 464 (first multiplexer) outputs an AC voltage to any one of four common lines 466 in accordance with a value of a selection control input from control device 485. Multiplexer 465 (second multiplexer) establishes electrical continuity between any one of four common lines 467 and the ground line in accordance with a value of a selection control input from control device 485.

The plurality of first coils 468 are arranged in a 4×4 matrix. By multiplexer 464 and multiplexer 465, the AC voltage from multiplexer 464 is applied to any one of sixteen first coils 468 at certain timing. The one of sixteen first coils 468 to which the AC voltage should be applied is determined in accordance with the selection control inputs transmitted from control device 485 to multiplexer 464 and multiplexer 465. Each of the plurality of first coils 468 forms a magnetic field for detection when the AC voltage for detection is applied thereto.

On the other hand, the plurality of second coils 478 are also arranged in a 4×4 matrix. Control device 485 is connected to signal processing circuit 471, multiplexer 474 and multiplexer 475. Signal processing circuit 471 is connected to resonant capacitor 472 and resonant resistor 473. Multiplexer 474 (third multiplexer) is connected to resonant capacitor 472, control device 485 and four common lines 476. Multiplexer 475 (fourth multiplexer) is connected to the ground line, control device 485 and four common lines 477. One common line 476 (third common line) is connected to one terminal of each of four second coils 478. One common line 477 (fourth common line) is connected to the other terminal of each of four second coils 478.

When an AC voltage is applied to any one of sixteen first coils 468, this first coil 468 forms a magnetic field for detection. Second coil 478 arranged to face this first coil 468 generates an induced voltage by the magnetic field for detection formed by this first coil 468. This second coil 478 that generates the induced voltage is specified in advance in accordance with selection control inputs transmitted from control device 485 to multiplexer 474 and multiplexer 475. In other words, this second coil 478 that generates the induced voltage is specified in advance as one second coil 478 whose induced voltage should be measured.

Here, a circuit constant is predetermined such that an equation of a resonant frequency $f=1/(2 \times Pi \times (L \times C)^{1/2})$ is satisfied between resonant capacitor 463 and each of the plurality of first coils 468. Likewise, a circuit constant is predetermined such that an equation of a resonant frequency $f=1/(2 \times Pi \times (L \times C)^{1/2})$ is satisfied between resonant capacitor 472 and each of the plurality of second coils 478. In these equations, f represents the resonant frequency [Hz] of oscillator 461, L represents the inductance [H] of each coil, and C represents the capacitance [F] of each capacitor. First coils 468 and second coils 478 are electromagnetically coupled to each other with a prescribed coupling coefficient. It is preferable that resonant frequency f be sufficiently higher (for example, at least 10 times higher) than the frequency of electric power transmitted between power receiving unit 210 and power transmitting unit 410. When the frequency of transmitted electric power is 85 kHz, for example, resonant frequency f may be set to 13.65 MHz.

A value of the induced voltage generated in second coil 478 is transmitted through multiplexer 474, resonant capacitor 472 and resonant resistor 473 to signal processing circuit 471 (for example, an AC/DC circuit). Signal processing circuit 471 converts the received information about the induced voltage of second coil 478 (that is, information about a result of foreign object detection) into a signal suitable for reception by control device 485. Control device 485 calculates a power receiving state (for example, power reception efficiency) of second coil 478 based on the value received from signal processing circuit 471, to determine whether there is a foreign object or not within the magnetic field for detection based on the power receiving state of second coil 478.

For example, if there is a foreign object near first coil 468 and second coil 478, a magnetic field formed between first coil 468 and second coil 478 links the foreign object to vary the value of an induced voltage generated in second coil 478. Control device 485 has an induced voltage generated in second coil 478 when there is no foreign object as a comparison value in advance. When the value received from signal processing circuit 471 is lower than this comparison value, control device 485 determines that there is a foreign object within the magnetic field for detection.

Whether there is a foreign object or not within the magnetic field for detection can be determined not only based on the power reception efficiency (electric power transmission efficiency) between first coil 468 and second coil 478, but also based on a variation in coupling coefficient between these coils. If a foreign object is detected, control device 485 transmits a signal for stopping the electric power transmission between power receiving unit 210 and power transmitting unit 410 to power transmitting ECU 320 (FIG. 1), and notifies a user accordingly by a not-shown notification device.

As was described at the beginning, before electric power transmission is performed, foreign object detector 460 and control device 485 can accurately detect the presence or absence of a foreign object. While electric power transmission is being performed, however, a magnetic field is formed around first coil 468 and second coil 478 (see an arrow AR in FIG. 4). Since the magnetic field (magnetic flux) links first coil 468 and second coil 478, an induced voltage is generated in first coil 468 and second coil 478 affected by the magnetic field. In particular, the stronger the magnetic field formed around first coil 468 and second coil 478, the greater the effect of the magnetic field on the output of second coil 478. In such a condition, even if first coil 468 forms a magnetic field for detection and second coil 478 receives a voltage, the value of the induced voltage output from second coil 478 contains a high amount of noise. Accordingly, it is not easy to accurately detect the presence or absence of a foreign object using foreign object detector 460 while electric power transmission is being performed.

In this embodiment, therefore, while electric power transmission is being performed, it is detected or determined whether there is a foreign object or not on an upper surface of or above power transmitting device 400 or in the vicinity of (around) power transmitting device 400 during a timing period when the strength of the magnetic field formed between power receiving coil 250 and power transmitting coil 450 is lower than a prescribed value. As a result, the detection of a foreign object can be performed with little effect of the magnetic field formed during the electric power transmission. The specific contents will be described later.

Figure 5:
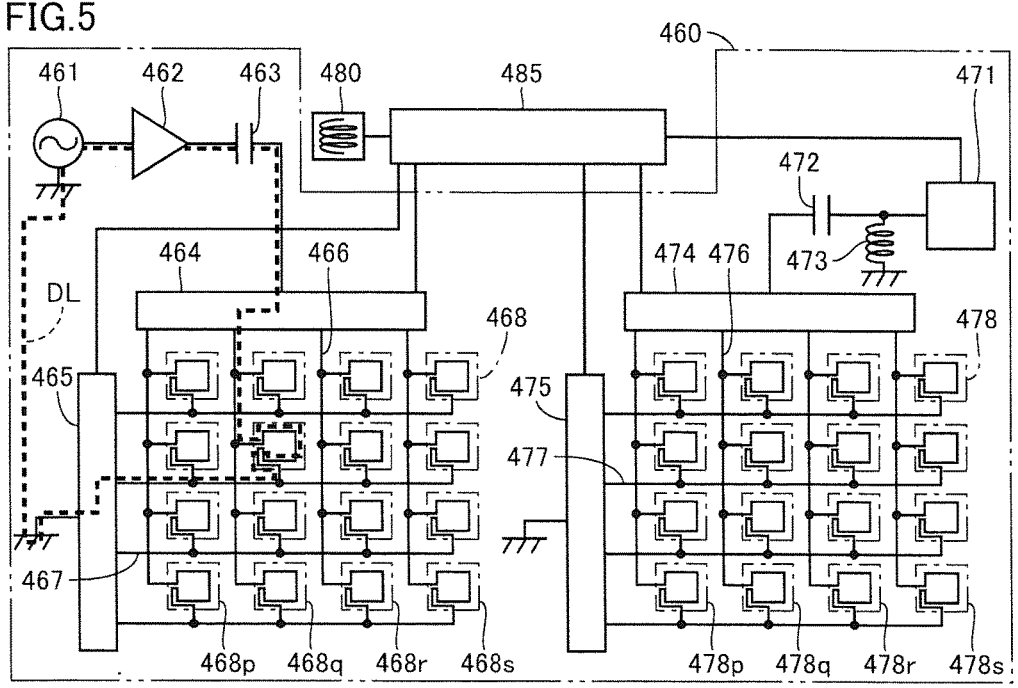
FIG. 5 is a diagram showing an electrical configuration (operating state) of the foreign object detector, the magnetic field detector and the control device included in the power transmitting device in the first embodiment.

Referring to FIG. 5, in this embodiment, the magnetic field formed during the electric power transmission also has the following effect. That is, it is preferable that as many pairs of coils (pairs of first coils 468 and second coils 478) as possible be disposed in the area where foreign object detector 460 detects a foreign object. The detection sensitivity of foreign object detector 460 can be increased that way. This is because, while first coil 468 forms the magnetic field for detection by receiving the AC voltage output from power amplifier 462, the induced voltage generated in second coil 478 is increased by focusing the AC voltage output from power amplifier 462 on forming a magnetic field for detection having a smaller area.

In addition, a smaller foreign object can be detected by reducing the size of first coils 468 and subdividing the positions where first coils 468 are disposed into smaller positions. Namely, it is preferable that as many pairs of coils (pairs of first coils 468 and second coils 478) as possible be disposed per unit area in the area of detection by foreign object detector 460. From this point of view, the matrix arrangement of the plurality of first coils 468 is employed in this embodiment.

As described above, in this embodiment, an AC voltage is selectively applied to one of the plurality of first coils 468 by multiplexers 464, 465 and common lines 466, 467. The use of multiplexers 464, 465 and common lines 466, 467 can provide partial commonality of the lines to prevent an increase in the amount of lines.

A line is a member that tends to function as a metal shield, and may cause lowering of the efficiency of electric power transmission performed between power receiving unit 210 and power transmitting unit 410. According to the configuration which employs multiplexers 464, 465 and common lines 466, 467, therefore, even if a larger number of first coils 468 are disposed, the commonality of the lines can advantageously suppress an increase in occupancy of the lines within foreign object detector 460, and can also suppress lowering of the electric power transmission efficiency. In addition, the size of each of first coils 468 can be increased by an amount equal to the prevented increase in the amount of lines.

When multiplexers 464, 465 and common lines 466, 467 are employed, on the other hand, an electrical loop indicated with a broken line in FIG. 5 is formed when an AC voltage is applied to one first coil 468. This loop indicated with the broken line in FIG. 5 shows a state in which an AC voltage is applied to a second from the left and second from the top first coil 468 in FIG. 5 at certain timing. This loop is formed of a path passing through this first coil 468, oscillator 461 and GND.

While electric power transmission is being performed between power receiving unit 210 and power transmitting unit 410, a magnetic field is also formed around this loop. Since the magnetic field (magnetic flux) links this loop, an induced voltage is also generated in the loop affected by the magnetic field. In such a condition, even if first coil 468 forms a magnetic field for detection and second coil 478 receives a voltage, the value of the induced voltage output from second coil 478 contains noise.

Figure 6:
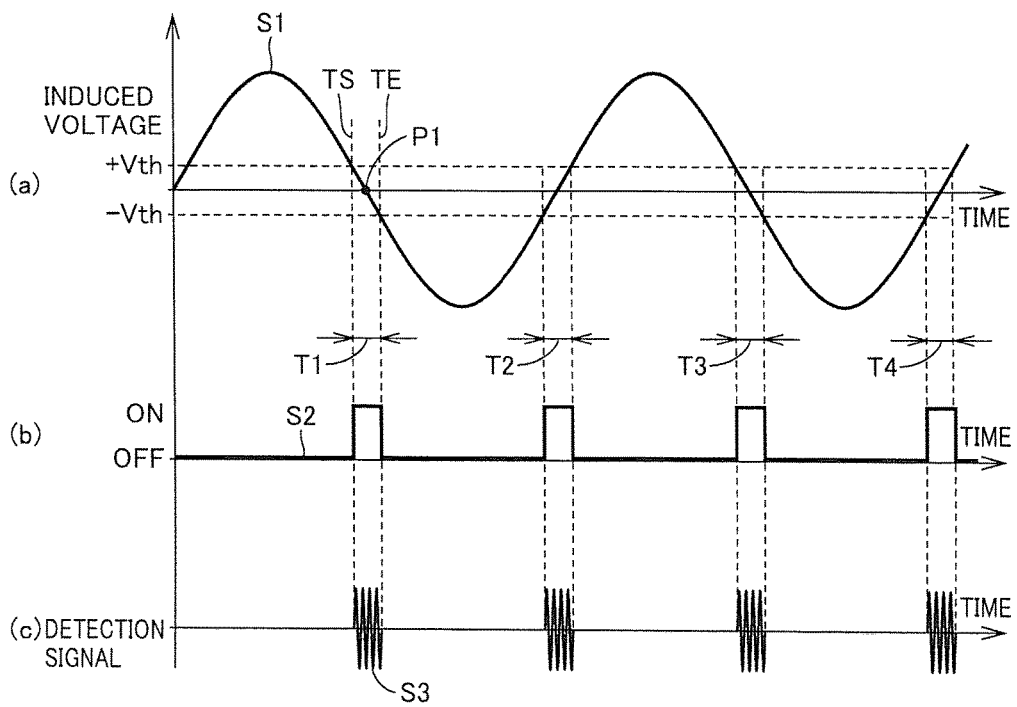
FIG. 6 shows a waveform of a magnetic field detected by the magnetic field detector in (a), shows a chart illustrating timing when the foreign object detector is activated in (b), and shows a value detected by the foreign object detector in (c), with respect to the first embodiment.

Referring to FIG. 6, in this embodiment, control device 485 performs the following operation so as to reduce the noise as described above contained in the value of the induced voltage output from second coil 478. As described above, the coil of magnetic field detector 480 transmits information about the induced voltage generated in this coil affected by the magnetic field to control device 485 as an electric signal. This information is represented as a waveform 51 in FIG. 6(*a*), for example.

This information represented as waveform 51 corresponds to the strength of the magnetic field formed between power receiving unit 210 and power transmitting unit 410. A point P1 in FIG. 6(*a*) indicates timing of so-called zero crossing, when the induced voltage generated in magnetic field detector 480 becomes 0V. A higher absolute value of the induced voltage generated in the coil of magnetic field detector 480 means a higher strength of the magnetic field formed between power receiving unit 210 and power transmitting unit 410.

That is, in this embodiment, a timing period when the induced voltage generated in the coil of magnetic field detector 480 is equal to or lower than a prescribed value is regarded as a timing period when the strength of the magnetic field formed between power receiving unit 210 and power transmitting unit 410 is equal to or lower than a prescribed value. Alternatively, an induced current generated in magnetic field detector 480 may be measured, and a timing period when the induced current is equal to or lower than a prescribed value may be regarded as a timing period when the strength of the magnetic field is equal to or lower than the prescribed value.

Based on the information from magnetic field detector 480, control device 485 transmits a selection control input to multiplexers 464, 465, 474 and 475 only during timing periods T1, T2, T3 and T4 when the absolute value of the induced voltage generated in the coil of magnetic field detector 480 is equal to or lower than a prescribed value (Vth). A starting point of the timing period when the absolute value of the induced voltage generated in the coil of magnetic field detector 480 is equal to or lower than the prescribed value (Vth) is indicated as a time TS in FIG. 6, and an end point thereof is indicated as a time TE.

Namely, control device 485 controls driving of foreign object detector 460 such that foreign object detector 460 detects the presence or absence of a foreign object only during this timing period T1 (between time TS and time TE) and timing periods T2, T3 and T4 (see a line S2 in FIG. 6(*b*)). The prescribed value (Vth) is, for example, several tens of mV. Timing periods T1, T2, T3 and T4 have a length of, for example, when the frequency of transmitted electric power is 85 kHz, approximately 1/100 of that frequency.

In a timing chart of FIG. 6(*b*), foreign object detector 460 detecting the presence or absence of a foreign object (a state in which the detection operation is being performed) is indicated as an ON state, and foreign object detector 460 not detecting the presence or absence of a foreign object (a state in which the detection operation is not being performed) is indicated as an OFF state. A waveform S3 shown in FIG.

6(c) schematically shows an output value from foreign object detector 460 (the value of the induced voltage generated in second coil 478). This value of the induced voltage (waveform S3) varies if there is a foreign object.

Between time TS and time TE, the strength of the magnetic field generated around first coil 468 and second coil 478 and the strength of the magnetic field generated around the aforementioned loop (the broken line in FIG. 5) are relatively low (specifically, lower than the strength during a time period other than the time period between time TS and time TE). Since foreign object detector 460 performs detection of a foreign object only during the timing period when the effect of the magnetic field is relatively small, it can be expected that foreign object detector 460 detects the presence or absence of a foreign object with certain accuracy even while electric power transmission is being performed between power receiving unit 210 and power transmitting unit 410.

When the absolute value of the induced voltage generated in magnetic field detector 480 is higher than the prescribed value (Vth), control device 485 causes multiplexers 464, 465, 474 and 475 to select a not-shown NC pin. As a result, the induced voltage generated in first coil 468 and second coil 478 is not applied to resonant capacitors 463 and 472.

Foreign object detector 460 may perform the detection operation throughout the time period between time TS and time TE, or such a configuration is not restrictive and foreign object detector 460 may perform the detection operation between a point in time when control device 485 detects point P1 (zero crossing) and time TE. As to these timing periods, optimal detection timing periods (cycles for the detection operation) may be calculated and determined by utilizing a timer function if control device 485 has the timer function.

According to the configuration as described above, the effect of the induced voltage generated in first coil 468 and second coil 478 and the aforementioned loop (the broken line in FIG. 5) can be reduced to thereby increase the inductance of second coil 478. The increase in inductance of second coil 478 also increases the induced voltage generated in second coil 478, thereby improving the sensitivity for detection of a foreign object.

As described above, multiplexers 464, 465, 474 and 475 function as a "switching device" in this embodiment. The switching device successively switches, at each timing period when the absolute value of the induced voltage generated in magnetic field detector 480 is equal to or lower than the prescribed value, combinations of one first coil 468 to which the AC voltage for detection should be applied and one second coil 478 whose induced voltage should be measured. For example, during timing period T1 in FIG. 6, the detection operation is performed using a first coil 468p and its corresponding second coil 478p in FIG. 5.

Likewise, the detection operation is performed using a first coil 468q and its corresponding second coil 478q in FIG. 5 during timing period T2 in FIG. 6, the detection operation is performed using a first coil 468r and its corresponding second coil 478r in FIG. 5 during timing period T3, and the detection operation is performed using a first coil 468s and its corresponding second coil 478s in FIG. 5 during timing period T4. The sixteen pairs of coils successively perform the foreign object detection. It is noted that since a current supplied to power transmitting unit 410 has a frequency of several tens of kHz, all pairs of the coils can be used once in a short period of time.

Since control device 485 determines whether there is a foreign object or not based on a result of foreign object detection performed during the aforementioned timing periods, it can be said that a result of foreign object detection with certain reliability is obtained. In addition, according to the pairs of coils arranged in a matrix, the position of a foreign object can be identified or estimated based on information about which pair of coils has detected the foreign object.

Second Embodiment

Figure 7:
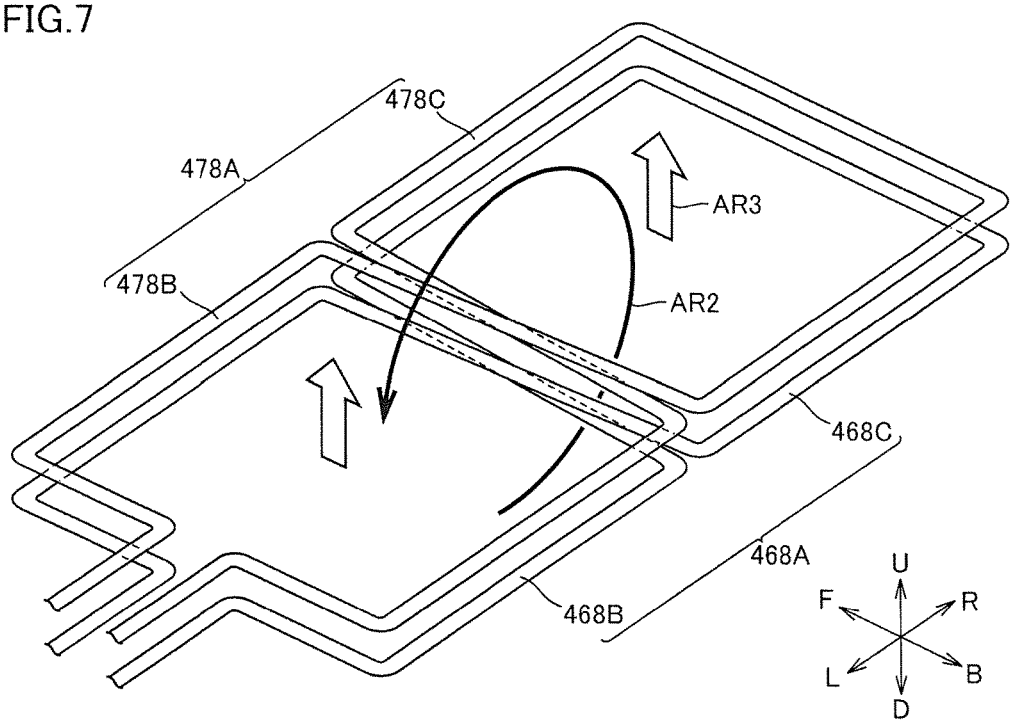
FIG. 7 is a perspective view showing a first coil and a second coil of a foreign object detector included in a power transmitting device in a second embodiment.

Referring to FIG. 7, in the first embodiment described above, the pair of coils shown in FIG. 4 (the pair of first coil 468 and second coil 478) is used as the foreign object detector. Instead of this pair of coils, a pair of coils shown in FIG. 7 (a pair of a first coil 468A and a second coil 478A) may be used.

First coil 468A has a shape formed by arranging a pair of coil elements 468B and 468C having the same number of turns and wound in opposite directions on the same plane and connecting the pair of coil elements 468B and 468C in series with each other. Coil elements 468B and 468C are aligned along a vehicle width direction (direction of arrows L and R).

Likewise, second coil 478A has a shape formed by arranging a pair of coil elements 478B and 478C having the same number of turns and wound in opposite directions on the same plane and connecting the pair of coil elements 478B and 478C in series with each other. Coil elements 478B and 478C are also aligned along the vehicle width direction (direction of arrows L and R).

While electric power transmission is being performed between power receiving unit 210 and power transmitting unit 410 (neither shown), a magnetic field (arrow AR3) caused by the electric power transmission affects the pair of coils shown in FIG. 7 (the pair of first coil 468A and second coil 478A) as well. The effect of the magnetic field on this pair of coils is reversed between the coil element 468B side and the coil element 468C side (see an arrow AR2). This also applies to coil elements 478B and 478C.

Accordingly, the effect of the magnetic field caused by the electric power transmission (namely, the generation of an induced voltage) on coil elements 468B, 468C, 478B and 478C can be suppressed. By suppressing the generation of an induced voltage by the magnetic field caused by the electric power transmission, entry of noise into the value of the induced voltage by the magnetic field for detection output from second coil 478A can be suppressed, thereby improving the detection sensitivity.

Third Embodiment

Figure 8:
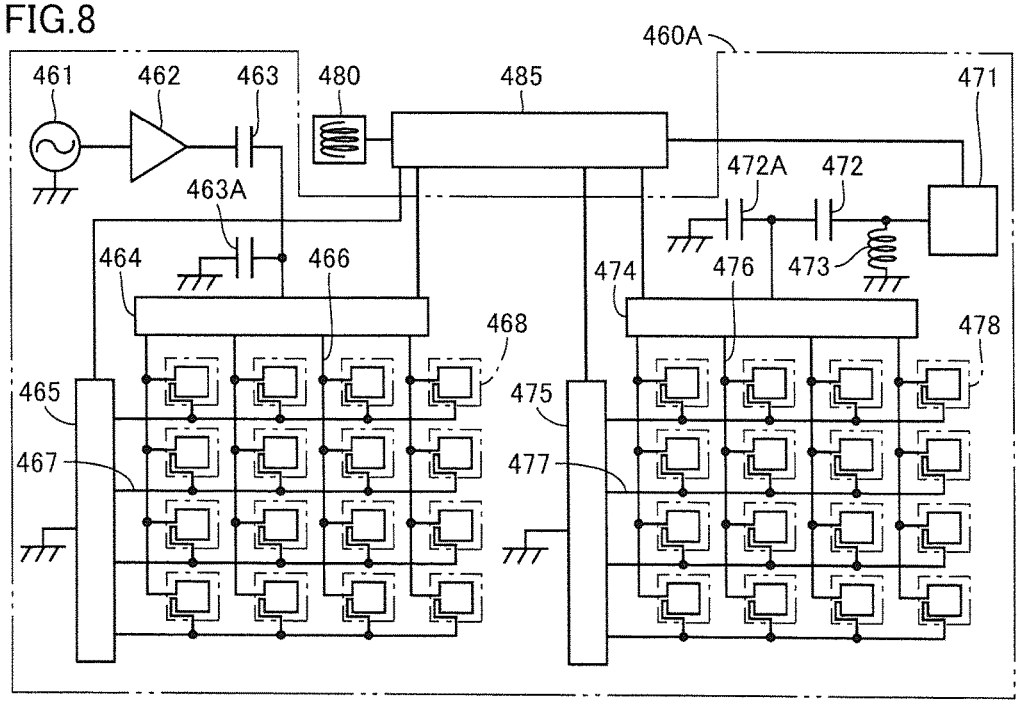
FIG. 8 is a diagram showing an electrical configuration of a foreign object detector, a magnetic field detector and a control device included in a power transmitting device in a third embodiment.

FIG. 8 is a diagram showing an electrical configuration of a foreign object detector 460A in a third embodiment. FIG. 8 corresponds to FIG. 3 in the first embodiment. Foreign object detector 460A further includes a resonant capacitor 463A connected in parallel to resonant capacitor 463, and a resonant capacitor 472A connected in series with resonant capacitor 472. By employing resonant capacitors 463A and 472A, the number of portions having a high voltage can be reduced.

Fourth Embodiment

Figure 9:
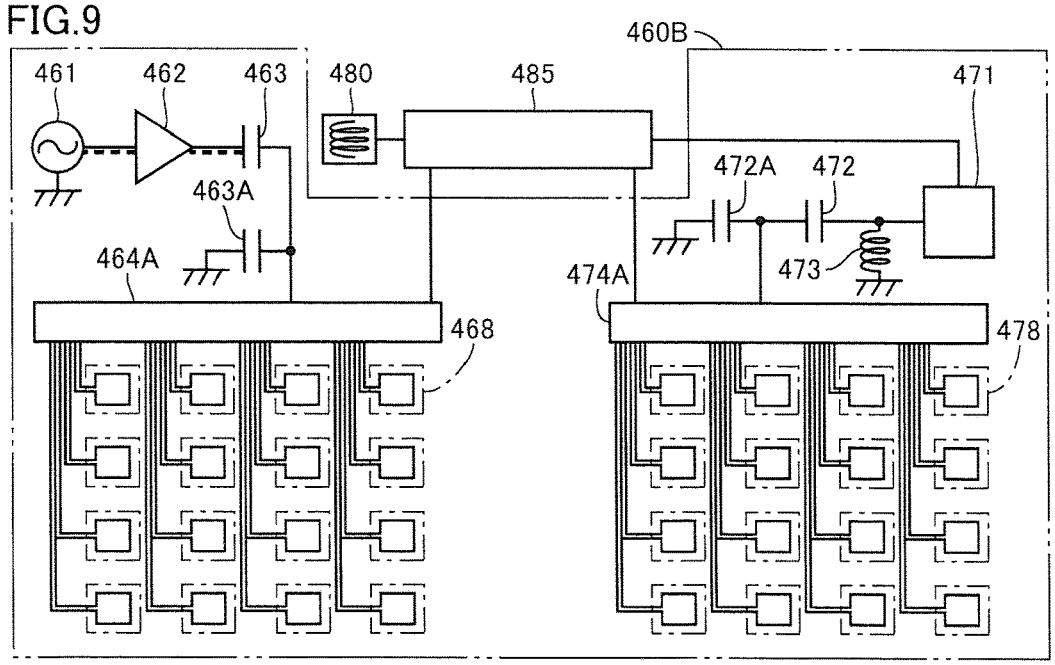
FIG. 9 is a diagram showing an electrical configuration of a foreign object detector, a magnetic field detector and a control device included in a power transmitting device in a fourth embodiment.

FIG. 9 is a diagram showing an electrical configuration of a foreign object detector 460B in a fourth embodiment. FIG. 9 corresponds to FIG. 3 in the first embodiment. Foreign object detector 460B employs a switching device 464A instead of multiplexers 464 and 465 (see FIG. 3) in the first embodiment, and employs a switching device 474A instead of multiplexers 474 and 475 (see FIG. 3). That is, the multiplexers and the common lines in the first embodiment are not essential components.

Switching devices 464A and 474A include switching elements which are connected to each of first coils 468 and each of second coils 478, respectively. Although switching devices 464A and 474A do not have a configuration providing commonality of lines in contrast to the first embodiment, switching devices 464A and 474A can also successively switch among combinations of one of the plurality of first coils 468 to which the AC voltage for detection should be applied and one of the plurality of second coils 478 whose induced voltage should be measured.

If foreign object detector 460B such as the one in this embodiment is used, control device 485 determines whether there is a foreign object or not based on a result of foreign object detection performed during the prescribed timing periods described above (see timing periods T1, T2, T3 and T4 in FIG. 6), thereby providing a result of foreign object detection with certain reliability.

Fifth Embodiment

Figure 10:
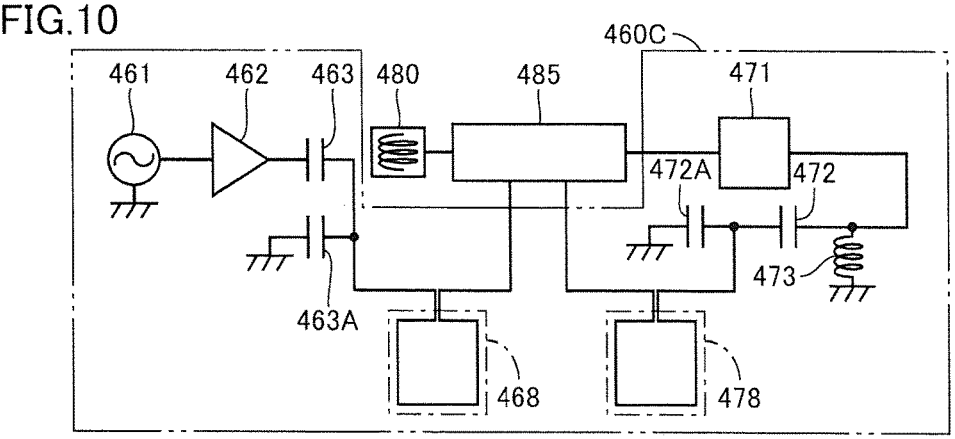
FIG. 10 is a diagram showing an electrical configuration of a foreign object detector, a magnetic field detector and a control device included in a power transmitting device in a fifth embodiment.

FIG. 10 is a diagram showing an electrical configuration of a foreign object detector 460C in a fifth embodiment. FIG. 10 corresponds to FIG. 3 in the first embodiment. Foreign object detector 460C employs one first coil 468 and one second coil 478. The size of these coils is larger than the size in the first embodiment. Although the area of detection is not subdivided, according to this configuration, control device 485 determines whether there is a foreign object or not based on a result of foreign object detection performed during the prescribed timing periods described above (see timing periods T1, T2, T3 and T4 in FIG. 6), thereby providing a result of foreign object detection with certain reliability.

Sixth Embodiment

Figure 11:
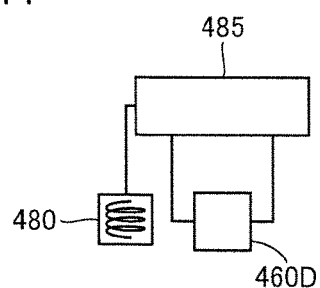
FIG. 11 is a diagram showing an electrical configuration of a foreign object detector, a magnetic field detector and a control device included in a power transmitting device in a sixth embodiment.

FIG. 11 is a diagram showing an electrical configuration of a foreign object detector 460D in a sixth embodiment. FIG. 11 corresponds to FIG. 3 in the first embodiment. Foreign object detector 460D does not have a configuration using a plurality of pairs of coils. As foreign object detector 460D, any detection means such as a single coil, a temperature sensor, a sonar sensor, and a pyroelectric sensor can be employed.

If there is a metallic foreign object in the vicinity of a single coil, an inductance value (L value) of the single coil varies. As a result, an induced voltage, a current and the like generated in the single coil during electric power transmission differ (vary) from those when there is no metallic foreign object. This variation can be utilized to detect a metallic foreign object. A temperature sensor such as an infrared sensor detects a physical amount which is infrared light in the area of detection. If a sonar sensor is employed, the sonar sensor detects a physical amount which is a sound reflection time. A pyroelectric sensor can detect a thermal variation in the area of detection with high accuracy, thereby detecting movement of an object having thermal energy with high accuracy.

In any case of the detection means, control device 485 determines whether there is a foreign object or not based on a result of foreign object detection performed during the prescribed timing periods described above (see timing periods T1, T2, T3 and T4 in FIG. 6), thereby providing a result of foreign object detection with certain reliability.

Seventh Embodiment

Figure 12:
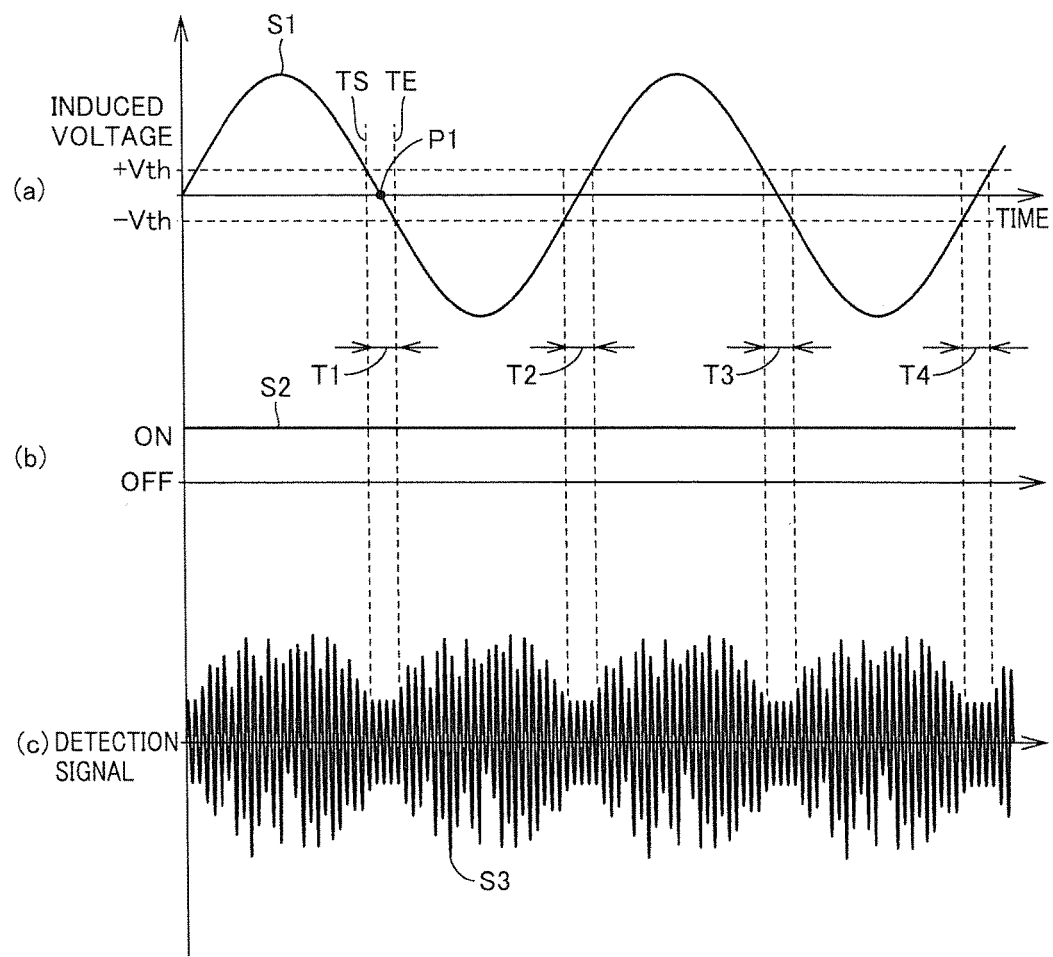
FIG. 12 shows a waveform of a magnetic field detected by a magnetic field detector in (a), shows a chart illustrating timing when the foreign object detector is activated in (b), and shows a value detected by the foreign object detector in (c), with respect to a seventh embodiment.

Referring to FIG. 12, control device 485 in the first embodiment described above (FIG. 6) controls driving of foreign object detector 460 such that foreign object detector 460 detects the presence or absence of a foreign object only during timing period T1 (between time TS and time TE) and timing periods T2, T3 and T4. Such a configuration is not restrictive, and the detection operation should only be required to be performed at least during timing periods T1, T2, T3 and T4, and may be performed during a time period other than timing periods T1, T2, T3 and T4, as shown in FIG. 12.

More specifically, a result of detection operation performed during a time period other than timing periods T1, T2, T3 and T4 is affected by the magnetic field of electric power transmission, and is thus not used to determine the presence or absence of a foreign object. On the other hand, by software processing, for example, control device 485 determines the presence or absence of a foreign object based on only a result of detection operation performed during timing periods T1, T2, T3 and T4. According to this configuration, since control device 485 determines, as a result, whether there is a foreign object or not based on a result of foreign object detection performed during the above timing periods, it can again be said that a result of foreign object detection with certain reliability is obtained.

Eighth Embodiment

Figure 13:
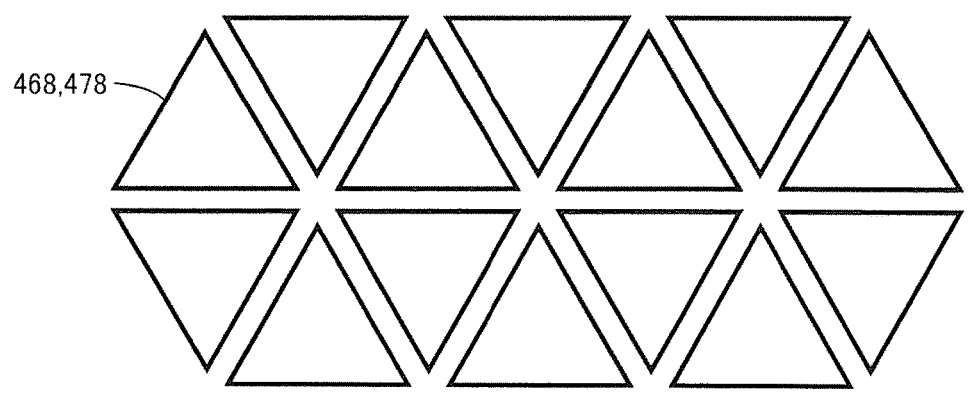
FIG. 13 is a plan view schematically showing first coils and second coils of a foreign object detector included in a power transmitting device in an eighth embodiment.
Figure 14:
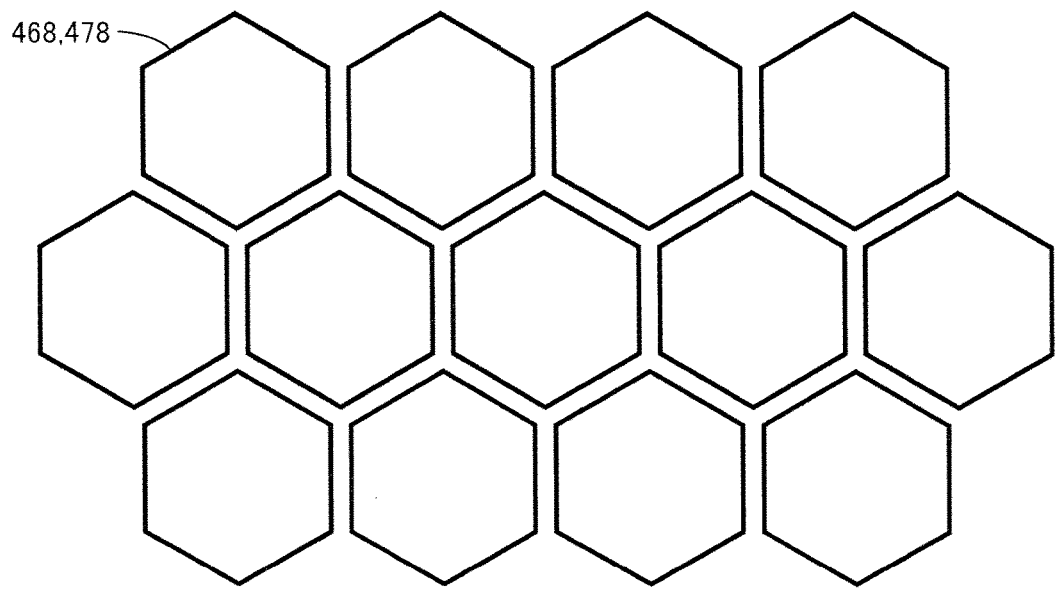
FIG. 14 is a plan view schematically showing first coils and second coils of a foreign object detector included in a power transmitting device in a first variation of the eighth embodiment.

Referring to FIG. 13, in the first embodiment described above (see FIG. 4), first coils 468 and second coils 478 each having a coil portion in a rectangular shape are used. As shown in FIG. 13, the coil portions of first coils 468 and second coils 478 may have a triangular shape. As shown in FIG. 14, the coil portions of first coils 468 and second coils 478 may have another polygonal shape such as a hexagonal shape. According to the coils in a polygonal shape, the detection sensitivities can be rendered uniform by making the coils to have the same size and shape.

Figure 15:
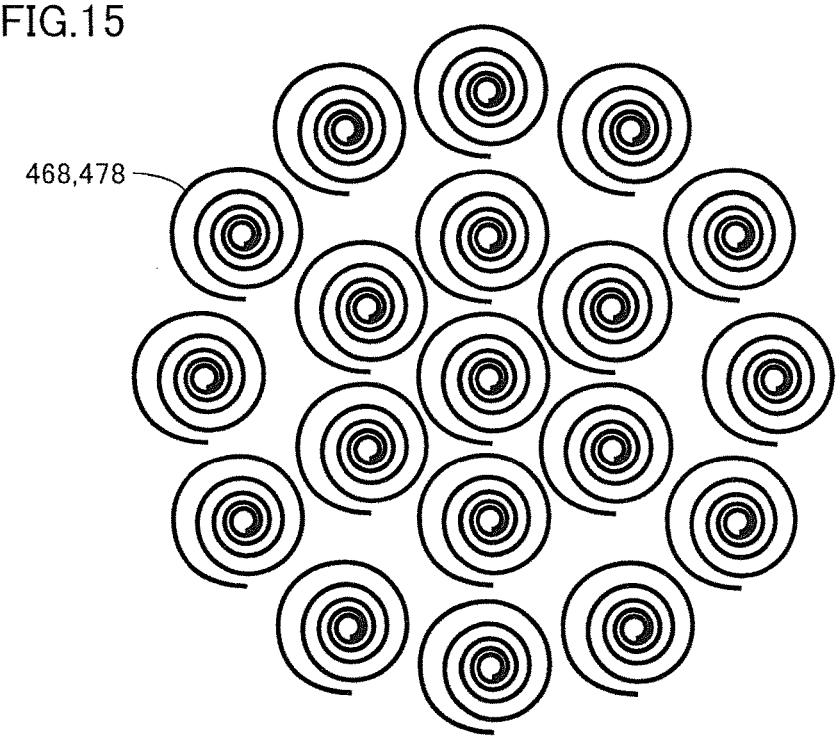
FIG. 15 is a plan view schematically showing first coils and second coils of a foreign object detector included in a power transmitting device in a second variation of the eighth embodiment.

As shown in FIG. 15, first coils 468 and second coils 478 each including a coil portion having a circular outer shape may be employed. In FIG. 15, a plurality of pairs of coils formed of first coils 468 and second coils 478 are concentrically disposed.

Ninth Embodiment

Figure 16:
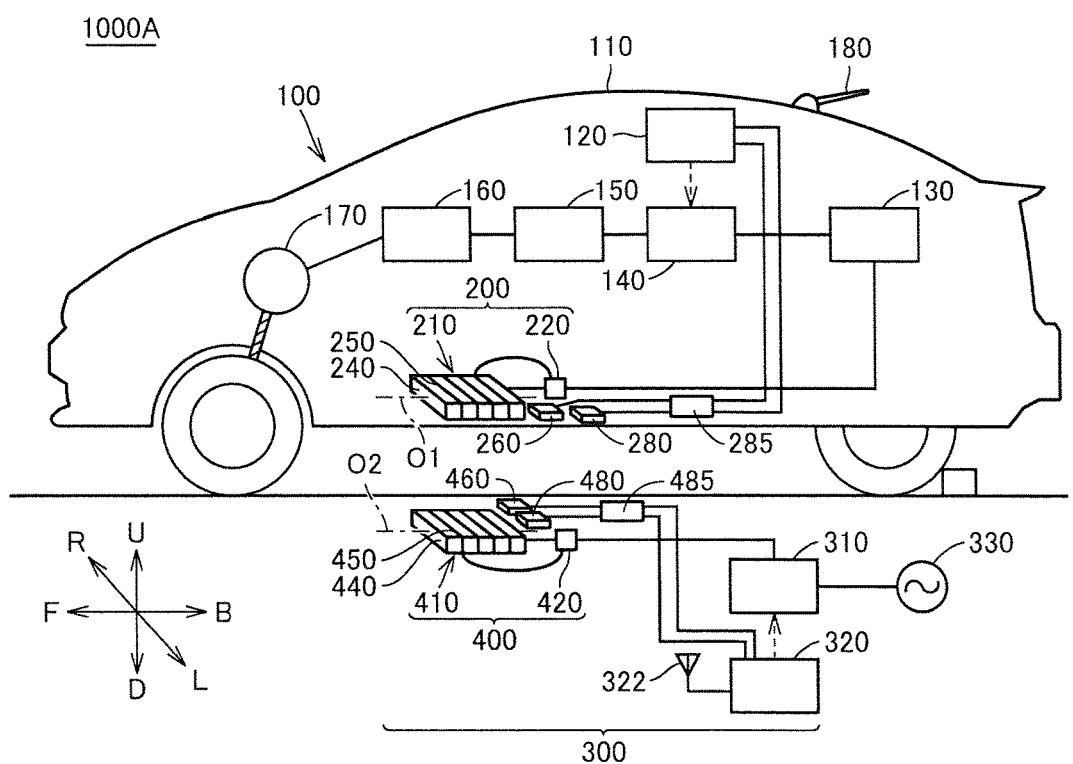
FIG. 16 is a diagram showing an electric power transmission system in a ninth embodiment.

Referring to FIG. 16, each of the above embodiments has been described based on foreign object detector 460 and the like mounted on power transmitting device 400. An idea substantially the same as the idea disclosed above can be applied to power receiving device 200 mounted on vehicle 100.

In a non-contact electric power transmission system 1000A shown in FIG. 16, power receiving device 200 further includes a foreign object detector 260, a magnetic field detector 280 and a control device 285. Foreign object detector 260, magnetic field detector 280 and control device 285 correspond to foreign object detector 460, magnetic field detector 480 and control device 485 in each of the above embodiments, and perform operations similar to their operations, respectively. That is, control device 285 determines whether there is a foreign object or not based on a result of foreign object detection performed during the prescribed timing periods described above (see timing periods T1, T2, T3 and T4 in FIG. 6), thereby providing a result of foreign object detection with certain reliability.

Namely, in this example shown in FIG. 16, too, a timing period when the induced voltage generated in the coil of magnetic field detector 480 (see FIG. 3) is equal to or lower than a prescribed value is regarded as a timing period when the strength of the magnetic field formed between power receiving unit 210 and power transmitting unit 410 is equal to or lower than a prescribed value. Then, detection of a foreign object is performed during a timing period when the strength of the magnetic field detected by magnetic field detector 480 (or the induced voltage generated in the coil) is equal to or lower than the prescribed value. As a result, it can be detected and determined with certain accuracy whether there is a foreign object or not below or on a lower surface of power receiving device 200 or in the vicinity of (around) power receiving device 200.

Although the embodiments of the present invention have been described above, the disclosure above is illustrative and non-restrictive in every respect. The technical scope of the present invention is defined by the terms of the claims, and is intended to include any modifications within the scope and meaning equivalent to the terms of the claims.

REFERENCE SIGNS LIST 100 vehicle; 110 vehicle body; 120 vehicle ECU; 130 rectifier; 140 converter; 150 battery; 160 power control unit; 170 motor unit; 200 power receiving device; 210 power receiving unit; 220, 420 capacitor; 240, 440 core; 250 power receiving coil; 260, 460, 460A, 460B, 460C, 460D foreign object detector; 280, 480 magnetic field detector; 285, 485 control device; 300 outside power feeding apparatus; 310 high-frequency power device; 320 power transmitting ECU; 322 communication unit; 330 AC power supply; 400 power transmitting device; 410 power transmitting unit; 430 housing; 432 shield; 434 cover member; 450 power transmitting coil; 461 oscillator; 462 power amplifier; 463, 463A, 472, 472A resonant capacitor; 464, 465, 474, 475 multiplexer; 464A, 474A switching device; 466, 467, 476, 477 common line; 468, 468A, 468$p$, 468$q$, 468$r$, 468$s$ first coil; 468B, 468C, 478B, 478C coil element; 471 signal processing circuit; 473 resonant resistor; 478, 478A, 478$p$, 478$q$, 478$r$, 478$s$ second coil; 1000, 1000A non-contact electric power transmission system; L1, L2 length; L3 distance; O1, O2 coil winding axis; P1 point; S1, S3 waveform; S2 line; T1, T2, T3, T4 timing period; TE, TS time.

The invention claimed is:

1. A power transmitting device that transmits electric power in a non-contact manner to a power receiving device provided outside, comprising:
   a power transmitting coil that forms a magnetic field when an AC voltage is applied thereto, and transmits electric power in a non-contact manner to a power receiving coil of said power receiving device through said magnetic field;
   a foreign object detector that detects a foreign object located on or in the vicinity of said power transmitting device;
   a magnetic field detector that detects said magnetic field; and
   a control device that receives information about a result of the detection of a foreign object by said foreign object detector and information about a result of the detection of said magnetic field by said magnetic field detector,
   said control device determining whether there is a foreign object or not based on the result of the detection of a foreign object performed by said foreign object detector during a timing period when the strength of said magnetic field that is detected by the magnetic field detector while electric power transmission is being performed is equal to or lower than a prescribed value.

2. The power transmitting device according to claim 1, wherein
   said magnetic field detector includes a coil where an induced voltage is generated by said magnetic field, and
   said timing period when the strength of said magnetic field is equal to or lower than said prescribed value is a timing period when an absolute value of the induced voltage generated in said coil by said magnetic field is equal to or lower than a prescribed value.

3. The power transmitting device according to claim 2, wherein
   said foreign object detector includes a first coil that forms a magnetic field for detection when an AC voltage for detection is applied thereto, and a second coil that is arranged to face said first coil and generates an induced voltage by said magnetic field for detection formed by said first coil, and
   said control device determines whether there is a foreign object or not based on a power receiving state of said second coil, said power receiving state being calculated from a value of the induced voltage generated in said second coil by said magnetic field for detection.

4. The power transmitting device according to claim 3, wherein
   said first coil and said second coil form a pair of coils,
   said foreign object detector includes a plurality of said pairs of coils,
   said power transmitting device further comprises a switching device that switches between pairs of coils to be selected of said plurality of pairs of coils, and
   said switching device successively switches between combinations of said first coil to which the AC voltage for detection is applied and said second coil whose induced voltage is calculated by successively switching between pairs of coils to be selected of said plurality of pairs of coils at each said timing period.

5. The power transmitting device according to claim 4, wherein
   each of said first coil and said second coil has a shape formed by arranging a pair of coil elements having the same number of turns and wound in opposite directions on the same plane and connecting said pair of coil elements in series with each other.

6. The power transmitting device according to claim 4, wherein
   said switching device includes
      a first multiplexer connected to one terminal of each of the plurality of first coils via a first common line,
      a second multiplexer connected to the other terminal of each of the plurality of first coils via a second common line,
      a third multiplexer connected to one terminal of each of the plurality of second coils via a third common line, and
      a fourth multiplexer connected to the other terminal of each of the plurality of second coils via a fourth common line.

7. The power transmitting device according to claim 6, wherein each of said first coil and said second coil has a shape formed by arranging a pair of coil elements having the same number of turns and wound in opposite directions on the same plane and connecting said pair of coil elements in series with each other.

8. The power transmitting device according to claim 3, wherein
each of said first coil and said second coil has a shape formed by arranging a pair of coil elements having the same number of turns and wound in opposite directions on the same plane and connecting said pair of coil elements in series with each other.

9. The power transmitting device according to claim 1, wherein
said foreign object detector includes a first coil that forms a magnetic field for detection when an AC voltage for detection is applied thereto, and a second coil that is arranged to face said first coil and generates an induced voltage by said magnetic field for detection formed by said first coil, and
said control device determines whether there is a foreign object or not based on a power receiving state of said second coil, said power receiving state being calculated from a value of the induced voltage generated in said second coil by said magnetic field for detection.

10. The power transmitting device according to claim 9, wherein
said first coil and said second coil form a pair of coils,
said foreign object detector includes a plurality of said pairs of coils,
said power transmitting device further comprises a switching device that switches between pairs of coils to be selected of said plurality of pairs of coils, and
said switching device successively switches between combinations of said first coil to which the AC voltage for detection is applied and said second coil whose induced voltage is calculated by successively switching between pairs of coils to be selected of said plurality of pairs of coils at each said timing period.

11. The power transmitting device according to claim 10, wherein
said switching device includes
a first multiplexer connected to one terminal of each of the plurality of first coils via a first common line,
a second multiplexer connected to the other terminal of each of the plurality of first coils via a second common line,
a third multiplexer connected to one terminal of each of the plurality of second coils via a third common line, and
a fourth multiplexer connected to the other terminal of each of the plurality of second coils via a fourth common line.

12. The power transmitting device according to claim 11, wherein
each of said first coil and said second coil has a shape formed by arranging a pair of coil elements having the same number of turns and wound in opposite directions on the same plane and connecting said pair of coil elements in series with each other.

13. The power transmitting device according to claim 10, wherein
each of said first coil and said second coil has a shape formed by arranging a pair of coil elements having the same number of turns and wound in opposite directions on the same plane and connecting said pair of coil elements in series with each other.

14. The power transmitting device according to claim 9, wherein
each of said first coil and said second coil has a shape formed by arranging a pair of coil elements having the same number of turns and wound in opposite directions on the same plane and connecting said pair of coil elements in series with each other.

15. A power receiving device that receives electric power in a non-contact manner from a power transmitting device provided outside, comprising:
a power receiving coil that receives electric power in a non-contact manner from a power transmitting coil of said power transmitting device through a magnetic field, said magnetic field being formed by said power transmitting coil when an AC voltage is applied thereto;
a foreign object detector that detects a foreign object located below or in the vicinity of said power receiving device;
a magnetic field detector that detects said magnetic field; and
a control device that receives information about a result of the detection of a foreign object by said foreign object detector and information about a result of the detection of said magnetic field by said magnetic field detector,
said control device determining whether there is a foreign object or not based on the result of the detection of a foreign object performed by said foreign object detector during a timing period when the strength of said magnetic field that is detected by the magnetic field detector while electric power transmission is being performed is equal to or lower than a prescribed value.

16. The power receiving device according to claim 15, wherein
said magnetic field detector includes a coil where an induced voltage is generated by said magnetic field, and
said timing period when the strength of said magnetic field is equal to or lower than said prescribed value is a timing period when an absolute value of the induced voltage generated in said coil by said magnetic field is equal to or lower than a prescribed value.

* * * * *